United States Patent [19]
Viertel et al.

[11] Patent Number: 5,964,493
[45] Date of Patent: Oct. 12, 1999

[54] SUN VISOR FOR VEHICLES

[75] Inventors: Lothar Viertel, Altforweiler, Germany; Patrick Welter, La Chambre, France

[73] Assignee: Becker Group Europe GmbH, Wuppertal, Germany

[21] Appl. No.: 09/120,827

[22] Filed: Jul. 22, 1998

[30] Foreign Application Priority Data

Jul. 22, 1997 [DE] Germany ............ 197 31 394

[51] Int. Cl.$^6$ ........................................ B60J 3/02
[52] U.S. Cl. ........................ 296/97.1; 296/97.9
[58] Field of Search .................. 296/97.1, 97.9

[56] References Cited

U.S. PATENT DOCUMENTS

| | | | |
|---|---|---|---|
| 4,664,435 | 5/1987 | Dietz et al. ............... | 296/97.1 |
| 4,773,698 | 9/1988 | Svensson ................ | 296/97.9 |
| 5,054,734 | 10/1991 | Gabas ................... | 296/97.9 X |

*Primary Examiner*—Joseph D. Pape
*Attorney, Agent, or Firm*—Harness, Dickey & Pierce, P.L.C.

[57] ABSTRACT

The present invention is directed to a sun visor for vehicles, which has a sun visor body which has a recess open at the edge of the body, through which a bearing pin passes. The recess is bordered by a bottom wall extending approximately parallel with the bearing pin and two lateral walls adjoining the bottom wall to the left and right of the bottom wall. To prevent the creation of the danger of blinding light passing through the recess, the invention features a closure cap, which screens the recess area between the lateral walls, as well as the recess area between the bottom wall and the bearing pin. The closure cap is hingedly arranged to the bottom wall.

11 Claims, 2 Drawing Sheets

SUN VISOR FOR VEHICLES

FIELD OF THE INVENTION

The invention relates to a sun visor for vehicles, which has a sun visor body which has a recess open at the edge of the sun visor body, through which a bearing pin passes. The recess is bordered by a bottom wall extending approximately parallel with the bearing pin and two lateral walls adjoining the bottom wall to the left and right of the bottom wall.

BACKGROUND OF THE INVENTION

Customary vehicle sun visors have a sun visor body, which can be fastened on the vehicle body by a main bearing shaft and a bearing pin. The main bearing shaft is seated so that one end of the shaft is positioned in the sun visor body while the other end is positioned in a pivot bearing housing. A seating pin engages a clip opening of a counter-bearing housing. The pivot bearing housing and the counter-bearing housing are fastened on the vehicle body. The connection between the counter-bearing housing and the bearing pin is releasable, so that, when required, the sun visor body can be released from the small counter-bearing bracket and pivoted toward a side window of a vehicle.

A customary sun visor of the type mentioned above is disclosed in, for example, German Patent Publication DE 33 42 897 A1. The sun visor body of this known sun visor also has a recess open at the edge of the body, through which a bearing pin passes. This is necessary to make possible the engagement and disengagement of the bearing pin with, or respectively, from the small counter-bearing bracket. For functional reasons, the recess open at the edge of the body is relatively large. This often results in complaints because an extremely undesirable entry of light may occur, which may result in blinding of the driver or the passenger of the vehicle, when the sun visor body is in different tilted positions.

SUMMARY OF INVENTION

It is therefore an object of the instant invention to provide a sun visor of the type mentioned above available, where the recess open at the edge of the sun visor body is provided so that it no longer poses a danger of blinding the driver or the passenger.

One advantage of the present invention is that the use of the closure cap practically occurs by itself during the manufacture of the sun visor body, so that no additional costs arise. The exception of additional costs is the one-time adaptation steps of the blowing mold tool. The closure is formed by a material flap which is present anyway and which up to now had been treated as waste and was scrapped.

Another advantage is the pleasing appearance of the sun visor. Another advantage is that the invention can be executed without problems even in connection with sun visors with covers. With these types of sun visors, a useful functional element in the form of a closure cap which shuts out light is also created from a former piece of scrap.

One aspect of the present invention provides a sun visor for a vehicle which has a sun visor body having an edge, and a recess at that edge. The recess is defined by a bottom wall and two lateral walls which join the left and right of the bottom wall and which extend in the direction toward the edge of the sun visor body. A bearing pin passes through the recess. In addition, a closure cap screens the recess area between the two lateral walls from light and screens the recess area between the bottom wall and the bearing pin from light. The closure cap is hinged to the bottom wall.

Preferably, the present invention includes a counter-bearing housing, within which the bearing pin is releasably seated so that the sun visor body may be tilted from a rest position to a vertical use position. The counter-bearing housing may define a clip opening for the insertion of the bearing pin.

In one aspect of the present invention, the closure cap is comprised of the same material as the sun visor body and is produced in one piece with the sun visor body. Preferably, the closure cap and the sun visor body are blow-molded from polypropylene materials. More preferably, the sun visor body and the closure cap are blow-molded such that the closure cap is connected in an easily separable manner to the bearing pin via a flash and the closure cap is connected with the bottom wall via a film hinge. Additionally, in one embodiment, the closure cap has a grainy surface structure which matches the grainy surface of the sun visor body. In another embodiment, the sun visor body has a covering made of a decor material, and the closure cap is made of the same decor material.

These and other objects, advantages, and features of the present invention will be better understood upon review of the following detailed description of the preferred embodiments.

DETAILED DESCRIPTION OF THE PREFERRED EMBODIMENTS

Figure 1:
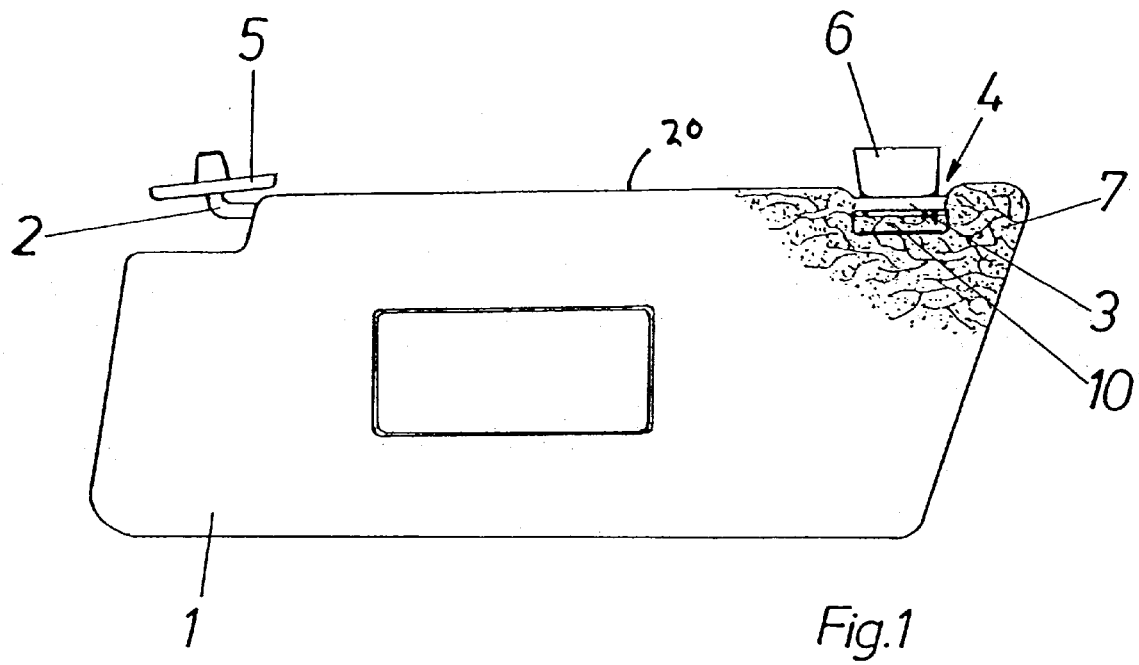
FIG. 1 is a plan view of a sun visor of the present invention.

As shown in FIG. 1, the novel sun visor of the present invention includes a sun visor body 1 with a main shaft 2 seated therein and a bearing pin 3 seated therein. The bearing pin 3 traverses a recess 4, which is open at one edge 20 of the body 1. A pivot bearing housing 5 is connected with the main shaft 2 and can be fixed in place on the vehicle body. A counter-bearing housing 6 may also be fixed in place on the vehicle body. The bearing pin 3 is releasably seated in the counter-bearing housing 6.

Figure 2:
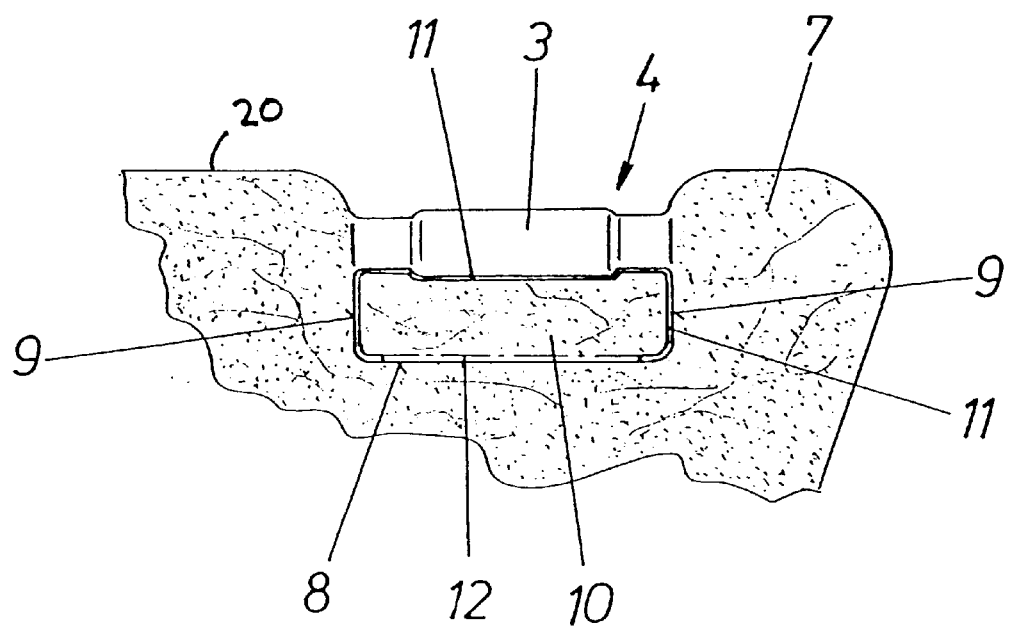
FIG. 2 is an exploded plan view of the recess of the sun visor body.

As shown in FIG. 2, the recess 4, which again is open at one edge 20 of the sun visor body 1, is bordered by a bottom wall 8 and by two lateral walls 9. The bottom wall 8 extends approximately parallel with the bearing pin 3. The two lateral walls 9 adjoin the bottom wall 8 on the left and the right of the bottom wall 8 and extend in the direction toward the edge 20 of the sun visor body 1. A characteristic feature of the novel sun visor of the present invention resides in that the recess area 4 between the lateral walls 9 on the one hand, and between the bottom wall 8 and the bearing pin 3 on the other hand, is filled in and screened by a closure cap 10. This closure cap 10 is connected with the lateral walls 9 and the bearing pin 3 via a flash 11, which can be easily destroyed.

The closure cap 10 is also connected via a solid film hinge 12 with the bottom wall 8 of the recess 4.

Figure 3:
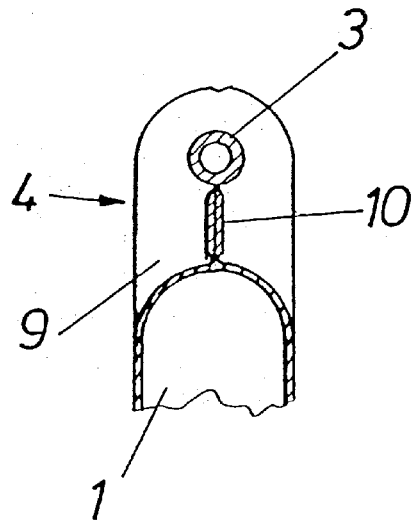
FIG. 3 is a sectional view through the counter-bearing area of the sun visor body.
Figure 4:
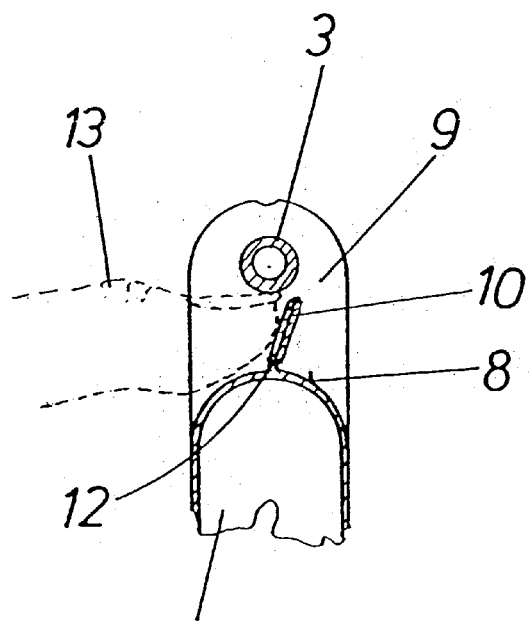
FIG. 4 is a sectional view of FIG. 3 which makes the exposure of the closure cap clear.

As shown in comparison of FIGS. 3 and 4, the flash 11 can be easily torn by means of the thumb 13 of a human hand. Thereafter, the cap 10 may be pivoted about the film hinge 12, which takes place automatically in the course of inserting the bearing pin 3 into a clip opening 14 of the counter-bearing housing 6, as well as in the course of tilting the sun visor body 1 from the rest position in FIG. 6 to the function position in FIG. 5.

Figure 5:
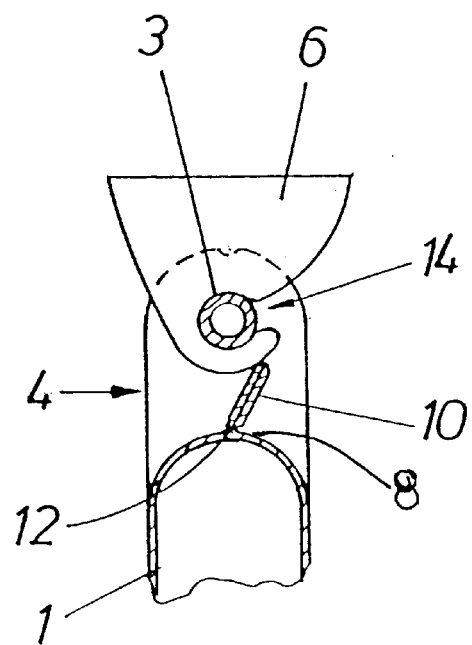
FIG. 5 is a sectional view through the counter-bearing area with the sun visor body in the function position.
Figure 6:
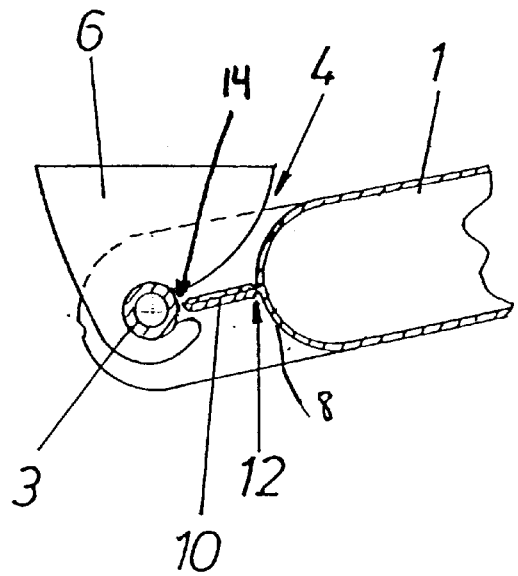
FIG. 6 is a sectional view of FIG. 5 with the sun visor body in the rest position.

FIGS. 5 and 6 illustrate an installation situation of the sun visor with a mass-produced counter-bearing housing 6. FIG. 5 illustrates the position of the sun visor body 1 in the vertical use position (or function position), where it can be clearly seen how the closure cap 10 closes off the otherwise customary opening against incoming light. FIG. 6 illustrates the rest position of the sun visor body 1 against the vehicle headliner, where the result for the viewer is a closed and harmonious appearance of the recess area 4 because of the presence of the closure cap 10.

Preferably, the sun visor body 1 is blow-molded, which can be manufactured in a conventional manner from a tubular film of polypropylene (PP) material and can have a grainy surface 7. In addition, preferably, the closure cap is comprised of the same material as the sun visor body and is produced in one piece with the sun visor body. More preferably, the sun visor body is a blow-molded body with the closure cap formed thereon, such that closure cap is connected in an easily separable manner with the sun visor body in the area of the bearing pin via the flash and is hinged to the bottom wall. The closure cap may be permanently connected with the sun visor body in the area of the bottom wall of the recess by means of the film hinge. In one embodiment, the closure cap has a grainy surface structure, which matches the surface of the sun visor body. In another embodiment, the sun visor body has a covering made of a decor material, and the closure cap is made of the same decor material.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A sun visor for a vehicle comprising;
    a sun visor body having an edge, said sun visor body defining a recess at said edge, said recess defined by a bottom wall and two lateral walls joined to a left and right of said bottom wall, wherein said two lateral walls extend in the direction toward said edge of said sun visor body,
    a bearing pin, which passes through said recess, and
    a closure cap, wherein said closure cap screens the recess area between said two lateral walls from light and screens the recess area between said bottom wall and said bearing pin from light, and wherein said closure cap is hinged to said bottom wall.

2. The sun visor of claim 1 further comprising:
    a counter-bearing housing, wherein said bearing pin is releasably seated within said counter-bearing housing so that said sun visor body may be tilted from a rest position to a vertical use position.

3. The sun visor of claim 2 wherein said counter-bearing housing defines a clip opening for the insertion of said bearing pin.

4. The sun visor of claim 1 wherein said closure cap is comprised of the same material as the sun visor body and is produced in one piece with the sun visor body.

5. The sun visor of claim 4 wherein said closure cap and said sun visor body are blow-molded from polypropylene materials.

6. The sun visor of claim 4 wherein said sun visor body and said closure cap are produced such that said closure cap is connected in an easily separable manner to said two lateral walls pin via a flash and said closure cap is connected with said bottom wall via a film hinge.

7. The sun visor of claim 4 wherein said sun visor body is blow-molded with said closure cap formed thereon, wherein said closure cap is connected in an easily separable manner to said sun visor body at said two lateral walls pin via a flash, and wherein said closure cap is permanently connected with said sun visor body in the area of said bottom wall of said recess by means of a film hinge.

8. The sun visor of claim 4 wherein said closure cap has a grainy surface structure and said sun visor body has a grainy surface, and wherein said grainy surface of said closure cap matches said grainy surface of said sun visor body.

9. The sun visor of claim 4 wherein said sun visor body has a covering made of a decor material, and said closure cap is made of the same decor material.

10. The sun visor of claim 1 wherein said closure cap has a grainy surface structure and said sun visor body has a grainy surface, and wherein said grainy surface of said closure cap matches said grainy surface of said sun visor body.

11. The sun visor of claim 1 wherein said sun visor body has a covering made of a decor material, and said closure cap is made of the same decor material.

\* \* \* \* \*

UNITED STATES PATENT AND TRADEMARK OFFICE
CERTIFICATE OF CORRECTION

PATENT NO. : 5,964,493
DATED : October 12, 1999
INVENTOR(S) : Viertel et al.

It is certified that error appears in the above-indentified patent and that said Letters Patent is hereby corrected as shown below:

Column 4, line 25, Claim 6, after "walls" please delete "pin".

Column 4, line 30, Claim 7, after "walls" please delete "pin".

Signed and Sealed this

Eleventh Day of July, 2000

Attest:

Q. TODD DICKINSON

Attesting Officer      Director of Patents and Trademarks